United States Patent [19]

Wald

[11] Patent Number: 4,665,165
[45] Date of Patent: May 12, 1987

[54] PHTHALOCYANINE BASIC DYESTUFFS

[75] Inventor: Roland Wald, Huningue, France

[73] Assignee: Sandoz Ltd., Basel, Switzerland

[21] Appl. No.: 860,620

[22] Filed: May 7, 1986

Related U.S. Application Data

[63] Continuation of Ser. No. 670,583, Nov. 13, 1984, abandoned, which is a continuation-in-part of Ser. No. 570,209, Jan. 12, 1984, abandoned.

[30] Foreign Application Priority Data

Jan. 13, 1983 [DE] Fed. Rep. of Germany ....... 3300915

[51] Int. Cl.$^4$ ...................... C09B 47/04; C09B 47/30
[52] U.S. Cl. .................................... 540/124; 540/125; 540/130
[58] Field of Search ............. 260/242.2, 245.1, 245.73, 260/245.76; 540/124, 125

[56] References Cited

U.S. PATENT DOCUMENTS 4,292,037 9/1981 Galafassi et al. ........................ 8/554
4,393,005 7/1983 Patsch et al. ................... 260/245.73

FOREIGN PATENT DOCUMENTS 1155983 5/1958 France .

Primary Examiner—Richard L. Raymond
Attorney, Agent, or Firm—Gerald D. Sharkin; Richard E. Vila; Thomas C. Doyle

[57] ABSTRACT

A compound or a mixture of compounds of formula I

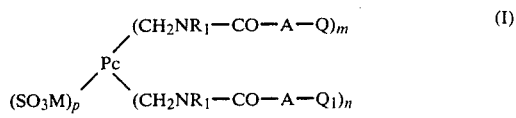

in which
Pc is a phthalocyanine group (which may be metallized or metal-free);
$R_1$ is hydrogen or lower alkyl;
Q and $Q_1$ are both either $-NR_2R_3$ or are both $-N^{\oplus}R_4R_5R_6$ $A_n^{\ominus}$ where $R_2$ to $R_6$ are organic substituents.
M is hydrogen or a cation;
A is a lower alkylene or a lower alkenylene;
$A_n^{\ominus}$ is a non-chromophoric anion;
m and n are average numbers from 0.3 to 4;
p is an average number from 0 to 1;
with the provisos that
(i) m+n is an average number from 2 to 6; and
(ii) Q and $Q_1$ are not the same group.

9 Claims, No Drawings

PHTHALOCYANINE BASIC DYESTUFFS

This is a continuation of application Ser. No. 670,583, filed Nov. 13, 1984, now abandoned, which in turn is a continuation-in-part of Ser. No. 570,209, filed Jan. 12, 1984, now abandoned.

The invention relates to mixtures of phthalocyanine compounds containing at least two cationic groups or two basic groups.

According to the invention there is provided a compound or mixture of compounds of the formula (I)

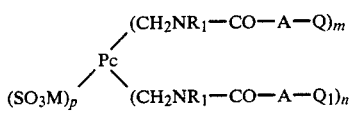

in which
Pc is a metal-free or metallised phthalocyanine group;
$R_1$ is hydrogen or unsubstituted $C_{1-4}$alkyl;
Q and $Q_1$ are
  either both of the formula $-NR_2R_3$,
  or are both of the formula $-N^{\oplus}R_4R_5R_6An^{\ominus}$
A is $C_{1-6}$alkylene or $C_{2-6}$alkenylene;
M is a cation or hydrogen;
$An^{\ominus}$ is a non-chromophoric anion;
m is an average number from 0.3 to 4 inclusive;
n is an average number from 0.3 to 4 inclusive;
p is an average number from 0 to 1 inclusive;
$R_2$ is hydrogen; unsubstituted $C_{1-12}$alkyl; unsubstituted phenyl; $C_{1-4}$alkyl substituted by one phenyl group, the phenyl group being unsubstituted or substituted by 1 to 3 unsubstituted $C_{1-4}$alkyl groups; $C_{2-4}$alkyl mono-substituted by OH other than in the α-position; or $C_{5-8}$cycloalkyl unsubstituted or substituted by 1 to 3 $C_{1-4}$alkyl groups; and
$R_3$ is hydrogen, unsubstituted $C_{1-12}$alkyl or $C_{2-4}$alkyl substituted by OH; or
$R_2$ and $R_3$ together with the N-atom to which they are attached form a 5- or 6-membered heterocyclic saturated ring;
$R_4$ has a significance of $R_2$ other than hydrogen;
$R_5$ has a significance of $R_3$ other than hydrogen; or
$R_4$ and $R_5$ together with the N-atom to which they are attached form a 5- or 6-membered heterocyclic saturated ring; and
$R_6$ is unsubstituted $C_{1-12}$alkyl, $C_{2-4}$alkyl mono-substituted by $-OH$ other other than in the α-position; or $C_{1-4}$alkyl substituted by unsubstituted phenyl;
or $R_4$, $R_5$ and $R_6$ together with the N-atom to which they are attached form a pyridinium ring unsubstituted or substituted by 1 or 2 $C_{1-4}$alkyl groups;
with the provisos that
  (i) m+n is an average number from 2 to 6 inclusive;
  (ii) Q and $Q_1$ are not the same group.

In this specification where any symbol appears more than once in a formula unless indicated to the contrary its significances are independent of one another.

Any alkyl, alkenylene, or alkylene group present is linear or branched.

Preferably when Q and $Q_1$ are $-NR_2R_3$ and one group $NR_2R_3$ is a dialkylamino group then $R_2$ and $R_3$ of such dialkylamino group are the same.

Preferably when Q and $Q_1$ are $-NR_2R_3$ and both $NR_2R_3$ groups are dialkylamino then each of $R_2$ and $R_3$ attached to the same nitrogen atom are the same.

Any alkyl, alkenylene or alkylene group present is preferably $C_{1-4}$.

Preferably when $R_2$ and $R_3$ or $R_4$ and $R_5$ together with the N-atom to which they are attached form a heterocyclic ring this is a morpholine, piperidine, pyrrolidine, piperazine unsubstituted or N-substituted by a $C_{1-4}$alkyl group; each ring being C-unsubstituted or C-substituted by 1 to 3 (preferably 1 to 2) $C_{1-4}$alkyl groups.

Preferably in $R_2$ $C_{5-8}$cycloalkyl is unsubstituted cyclopentyl or unsubstituted cyclohexyl.

Preferred compounds or mixtures of compounds of formula I are of formula II

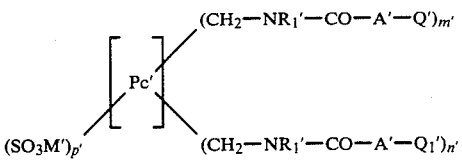

in which
Pc' is copper, cobalt, iron, zinc, aluminium or nickel phthalocyanine;
$R_1'$ is hydrogen or methyl;
Q' and $Q_1'$ are either both $-NR_2'R_3'$ or are both $-N^{\oplus}R_4'R_5'R_6'An^{\ominus}$
A' is $C_{1-4}$alkylene or

M' is hydrogen, sodium, lithium, potassium or ammonium
m' is an average number from 0.3 to 3 inclusive;
n' is an average number from 0.3 to 3 inclusive;
p' is an average value of 0 to 0.7 inclusive;
$R_2'$ is hydrogen, unsubstituted $C_{1-6}$alkyl, β-hydroxyethyl, unsubstituted cyclohexyl, unsubstituted phenyl or unsubstituted benzyl;
$R_3'$ is hydrogen, unsubstituted $C_{1-6}$alkyl or β-hydroxyethyl; or $R_2'$ and $R_3'$ together with the N-atom to which they are attached form an unsubstituted morpholine, unsubstituted piperidine, unsubstituted pyrrolidine, unsubstituted piperazine or

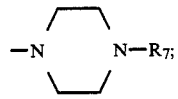

$R_4'$ has a significance of $R_2'$ except hydrogen;
$R_5'$ has a significance of $R_3'$ except hydrogen or
$R_4'$ and $R_5'$ together with the N-atom to which they are attached form

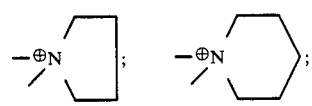

-continued

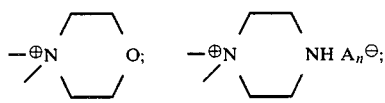

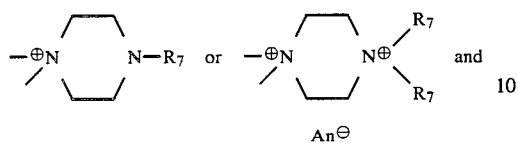

$R_6'$ is unsubstituted $C_{1-4}$alkyl, β-hydroxyethyl or benzyl or $R_4'$, $R_5'$ and $R_6'$ together with the N-atom to which they are attached form an unsubstituted pyridinium or 2- or 3-methylpyridinium or 1,2- or 1,3-dimethylpyridinium;

$R_7$ is an unsubstituted $C_{1-4}$alkyl;

with the provisos that
(i) $m'+n'$ is an average number from 2 to 4 inclusive;
(ii) $Q'$ and $Q_1'$ are not the same group.

More preferred compounds or mixtures of compounds of formula I are of formula III

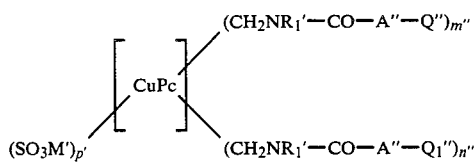 III in which
CuPc is copper phthalocyanine;
$A''$ is $-CH_2-$, $-CH_2CH_2-$ or

$Q''$ and $Q_1''$ are either both $-NR_2''R_3''$ or are both $-N^{\oplus}R_4''R_5''R_6''An^{\ominus}$;
$R_2''$ is hydrogen, methyl, ethyl, n-propyl, isopropyl or butyl;
$R_3''$ (independently of $R_2''$) has a significance of $R_2''$ or
$R_2''$ and $R_3''$ together with the N-atom to which they are attached form an unsubstituted morpholine, unsubstituted pyrrolidine, unsubstituted piperidine, unsubstituted piperazine ring; or N-methyl piperazine;
$R_4''$ is methyl or ethyl;
$R_5''$ is methyl or ethyl; or
$R_4''$ and $R_5''$ together with the N-atom to which they are attached form

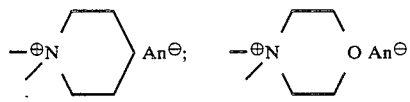

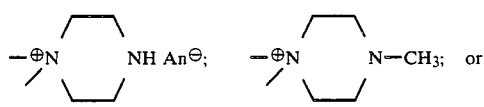

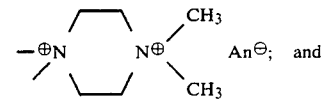

$R_6''$ is methyl, ethyl or benzyl or
$R_4''$, $R_5''$ and $R_6''$ together with the N-atom to which they are attached form an unsubstituted pyridinium, 2- or 3-methylpyridinium or 1,2- or 1,3-dimethylpyridinium;
$m''$ is an average number from 0.3 to 2.5 inclusive;
$n''$ is an average number from 0.3 to 2.5 inclusive.

with the provisos that
(i) $m''+n''$ is an average number from 2.1 to 3 inclusive; and
(ii) $Q''$ and $Q_1''$ are not the same group; and
(iii) $R_2''$ and $R_3''$, when alkyl, are the same.

In the above formulae I to III where appropriate:
Pc is preferably CuPc as defined above;
A is preferably $A'$; more preferably $A''$; most preferably A is $-CH_2-_{1-2}$;
Q is preferably $Q'$, more preferably $Q''$;
$Q_1$ is preferably $Q_1'$, more preferably $Q_1''$;
M is preferably $M'$;
m is preferably $m'$; more preferably $m''$; most preferably 1 to 1.5;
n is preferably $n'$; more preferably $n''$; most preferably 1 to 1.5;
p is preferably $p'$;
$R_1$ is preferably $R_1'$ more preferably is hydrogen.
$R_2$ is preferably $R_2'$ more preferably $R_2''$;
$R_3$ is preferably $R_3'$ more preferably $R_3''$;
$R_4$ is preferably $R_4'$ more preferably $R_4''$;
$R_5$ is preferably $R_5'$ more preferably $R_5''$;
$R_6$ is preferably $R_6'$ more preferably $R_6''$;
the cyclic significance of $R_2$ and $R_3$ are preferably those of $R_2'$ and $R_3'$ more preferably those of $R_2''$ and $R_3''$;
the cyclic significances of $R_4$ and $R_5$ are preferably those of $R_4'$ and $R_5'$, more preferably those of $R_4''$ and $R_5''$;
the cyclic significance of $R_4$, $R_5$ and $R_6$ are preferably those of $R_4'$, $R_5'$ and $R_6'$, more preferably those of $R_4''$, $R_5''$ and $R_6''$.

Preferably when one of Q and $Q_1$ is a non-cyclic significance the other of Q and $Q_1$ is a cyclic significance.

Preferably Q and $Q_1$ have at least a difference of two carbon atoms.

Compounds or mixtures of compounds of formula I can be prepared by
(i) reacting 1 mol of a compound of formula IV

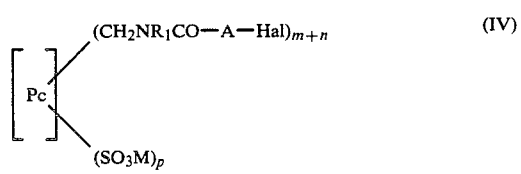 (IV)

in which Hal is halogen (preferably F, Cl or Br) and the other symbols are defined above;
with m moles of a compound of formula V $H-Q$ (V)

in water at a temperature of 20° to 50° C. (preferably 30° to 45° C.) and in a pH range of 9 to 12 (preferably 10 to 11) in the presence of a base followed by (ii) reacting the resulting product with n moles of a compound of formula VI

in water at a temperature of 40° to 80° C. (preferably 50° to 60° C.) and at a pH of 9 to 12 (preferably 10 to 11) in the presence of a base.

Preferably in steps (i) and (ii) above the base is an alkali metal hydroxide for example KOH or NaOH.

Compounds of formula IV, V and VI are known or may be prepared from known compounds by known methods.

In the compounds or mixture of compounds of formula I the anions $An^\ominus$ can be any non-chromophoric anions such as those conventional in basic dyestuff chemistry. Suitable anions include chloride, bromide, sulphate, bisulphate, methylsulphate, aminosulphonate, perchlorate, benzenesulfonate, oxalate, maleate, acetate, propionate, lactate, succinate, tartrate, malate, methanesulphonate and benzoate, as well as complex anions, for example, zinc chloride double salts and anions of boric acid, citric acid, glycollic acid, diglycollic acid and adipic acid or addition products of orthoboric acid with polyalcohols with at least one cis diol group present. These anions can be exchanged for each other by ion exchange resins or by reaction with acids or salts, for example via the hydroxide or bicarbonate or according to German Offenlegungsschrift No. 2,001,748 or No. 2,001,816.

The compounds or mixture of compounds of formula I are suitably worked up into solid or liquid preparations, for example by granulation or by dissolving in a suitable solvent. The compounds or mixture of compounds of formula I may be used in quaternised form and/or in the form of a salt of a mineral or organic acid or in the form of an internal salt. The compounds or mixtures of compounds of formula I are suitable for dyeing, padding or printing on fibres, threads or textile materials particularly natural or regenerated cellulose materials for example cotton, or synthetic polyamides or synthetic polyesters in which the anionic groups have been modified. Such a polyamide is described in Belgian Pat. No. 706,104 and such a synthetic polyester is described in U.S. Pat. No. 3,379,723.

The compounds or mixture of compounds of formula I may also be applied to bast fibres such as hemp, flax, sisal, jute, coir or straw.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile material may also be dyed by the compounds or mixture of compounds of formula I in organic solvents, e.g. in accordance with the directions given in German Offenlegunsschrift No. 2,437,549.

Cellulose material is mainly dyed by the exhaust process i.e. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:5 to 1:15. The pH of the dye bath varies between 3 and 10 (for short and long dyebaths). Dyeing preferably takes place in the presence of electrolytes.

Printing may be effected by impregnation with a printing paste produced by known methods.

The compounds or mixtures of compounds of formula I are also suitable for dyeing or printing paper, e.g. for the production of bulk-dyed, sized and unsized paper. The dyestuffs may similarly be used for dyeing paper by the dipping process. The dyeing of paper is effected by known methods.

The compounds or mixtures of compounds of formula I are also suitable for dyeing or printing leather by known methods.

Dyeings with good fastness are obtained on both paper and leather.

Dyeings prepared with compounds or mixtures of compounds of formula I on paper produce a substantially clear spent waste liquor which is important for environmental reasons. The dyes of formula I have good build-up properties, do not run once applied to paper and are not pH sensitive. Dyeings produced with dyes of formula I have good light fastness and the nuance on exposure for a long time to light fades tone in tone. The dyes of formula I have good wet-fastness properties not only for water but also for milk, soap, water, sodium chloride solution, fruit juice, and sweetened mineral water. Further dyeings made with dyes of formula I are fast for alcoholic beverages due to a good alcohol fastness. Further, the dyes of formula I have good nuance stability.

The compounds or mixtures of compounds of formula I have good water solubility. Furthermore, they exhibit very little to no bleeding.

In the following Examples all parts and percentages given are by weight and the temperatures given are in degrees Centigrade, unless indicated to the contrary.

EXAMPLE 1

28 Parts (1/30 mol) of an average 50:50% mixture of bis- and tris(chloracetylamidomethyl)copper phthalocyanine is made into a paste with 300 parts of water. The pH is brought to 7-8 by the addition of 30% NaOH solution.

2.84 Parts (1/30 mol) of piperidine is added whilst stirring at 20° to 30°, after which the solution is warmed to 40° to 43°. The pH of the solution is held at 10.5 to 11.0 by the dropwise addition of 4.5 parts (1/30 mol) of a 30% sodium hydroxide solution. The reaction is terminated as soon as the pH remains constant. The resulting dyestuff mixture is of the formula 1a

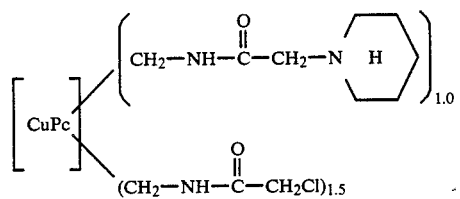

This mixture is fully dissolvable in 40 to 45% acetic acid solution.

10 Parts (1/10 mol) of dibutylamine is added to the reaction mixture containing the mixture of formula 1a and the mixture so formed is stirred at 55° to 60° until the pH reaches a constant value of 10.5 to 11.0 by the dropwise addition of 6.7 parts (1/20 mol) of 30% solution of sodium hydroxide.

The resulting dyestuff mixture is then filtered and is washed with salt-free water and dried at 60° C.

The resulting dyestuff mixture is of the formula 1(b)

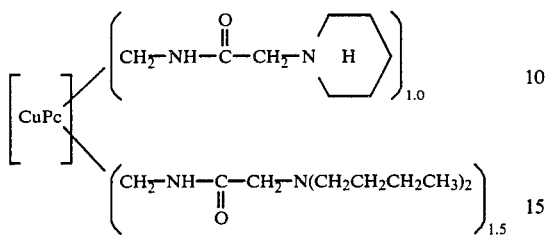

The mixture dissolves in dilute acetic acid solution and in dilute lactic acid and gives a brilliant blue colour. Paper dyed with this dyestuff mixture has excellent wet fastness properties and the resulting dyebath is practically colourless. The dyeings so produced have good light fastness properties.

EXAMPLE 2

Instead of the mixture of bis- and tris-(chloracetylamidomethyl)copper phthalocyanine used in the method of Example 1, 26.6 parts of a mixture of 90:10% bis- and tris-(chloracetylamidomethyl)copper phthalocyamine is used. The resulting dyestuff mixture is of formula 2a

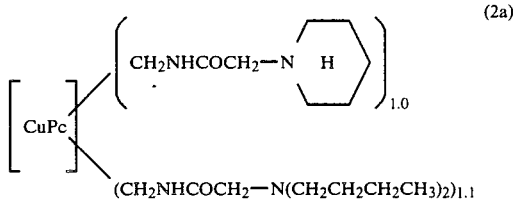

The mixture has good solubility in dilute acetic acid solution and lactic acid solution and dyeings made with the mixture have good fastness properties.

EXAMPLES 3 TO 10

Dyestuff mixtures of formula 3a

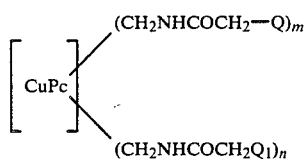

in which Q, $Q_1$, m and n are defined in the columns of the Table below can be prepared by a method analogous to that of Example 1 from known starting materials.

TABLE

| EX. No. | Q | m | $Q_1$ | n |
|---|---|---|---|---|
| 3 | $-N(C_2H_5)_2$ | 1 | $-N(CH_2CH_2CH_2CH_3)_2$ | 1.5 |
| 4 | $-N(CH_2CH_2CH_3)_2$ | 1 | " | 1.4 |
| 5 | $-N(CH\begin{smallmatrix}CH_3\\CH_3\end{smallmatrix})_2$ | 1 | " | 1.4 |
| 6 | " | 1 | $-N\langle H \rangle$ (piperidine) | 1.4 |
| 7 | $-N\langle H \rangle$ | | $-N(CH_2CH_2CH_3)_2$ | 1.4 |
| 8 | " | 1 | $-N(CH_2CH_2CH_2CH_3)_2$ | 1.3 |
| 9 | $-N\langle H \rangle$ | 1 | $-N\langle H \rangle$ | 1.3 |
| 10 | " | 0.3 | " | 2 |

The dyestuff mixtures of Examples 3 to 10 dye paper a brilliant blue tone and the dyeings so produced have good fastness properties, particularly light fastness and wet fastness properties.

EXAMPLE 11

21 Parts (1/40 mol) of a 50% mixture of bis- and tris-chloracetylamidomethyl)copper phthalocyanine are stirred into 350 parts of water and the mixture is brought to pH 7 to 8 by the addition of a 30% NaOH solution. 3.3 Parts (1/40 mol) of a 45% trimethylamine solution are added and the reaction mixture is heated to 38° to 42°. The pH of the solution is brought to 10 to 10.5 by the addition of 3.4 parts (1/40 mol) of a 30% NaOH solution. 6 Parts (3/40 mol) of pyridine are added and the temperature is raised to 55° to 60° and by the addition of about 5.1 parts of a 30% NaOH solution the reaction mixture is held at a pH of 10.5 to 11. After stirring for 3 hours the dyestuff is filtered and washed with neutral and salt-free water and dried. The resulting dyestuff mixture is of formula 11a

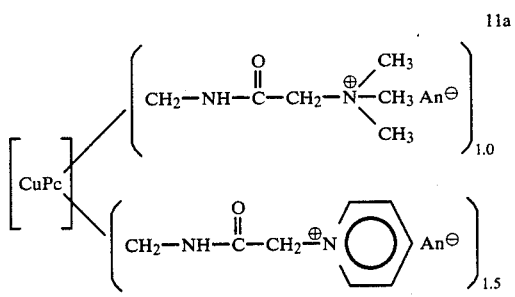

The dyestuff mixture of formula 11a dissolves in dilute acetic acid and dilute lactic acid solution and dyeings on paper made with the dyestuff mixture are blue and have good fastness properties in particular good wet fastness properties.

Application Example A

70 Parts of chemically bleached sulphite cellulose obtained from pinewood and 30 parts of chemically bleached sulphite cellulose obtained from birchwood are ground in 2000 parts of water in a Hollander. 0.2 Parts of the dyestuff mixture of Example 1 are added into this pulp. Paper is produced from this pulp after mixing for 20 minutes. The absorbent paper which is obtained in this manner is dyed a blue tone and the waste water is practically colourless.

Application Example B 0.5 Parts of the dyestuff mixture of Example 1 are dissolved in 100 parts of hot water and cooled to room temperature. The solution is added to 100 parts of chemically bleached sulphite cellulose which have been ground in a Hollander with 2000 parts of water. Sizing takes place after a thorough mixing for 15 minutes. The paper which is produced from this material has a blue tone of middle intensity and has good fastness properties.

Application Example C

An absorbent web of unsized paper is drawn at a temperature of 40° to 50° C. through a dyestuff solution having the following composition:
0.5 parts of the dyestuff mixture of Example 1
0.5 parts of starch
99.0 parts of water.
The excess dyestuff solution is squeezed out through two rollers. The dried web of paper is dyed a blue tone and has good fastness properties.

Application Example D

2 Parts of the dyestuff mixture of Example 1 are dissolved in 4000 parts of demineralised water at 40° C. 100 Parts of a prewetted cotton textile substrate are added and the bath is raised to boiling point over 30 minutes and held at the boil for 1 hour, topping up with water where necessary. After removing the dyed web from the bath washing and drying, a blue dyeing is obtained with good light fastness and wet fastness properties. The dye exhausts practically totally and the waste water is practically colourless.

Application Example E

100 Parts of freshly tanned and neutralized chrome leather are agitated for 30 minutes in a vessel with a dyebath of 250 parts of water and 1 part of the dyestuff mixture of Example 1 at 55° C. and are then treated in the same bath for 30 minutes with 2 parts of an anionic fatty liquor based on sulphonated train oil. The leather is then dried and prepared in the normal way, giving a leather evenly dyed in a blue tone.

Other low affinity vegetable tanned leathers can be similarly dyed by known methods.

Any one of the dyestuff mixtures of Examples 2 to 11 may be used in place of that of Example 1 in any one of Application Examples A to E.

What is claimed is:

1. A compound or mixture of compounds of the formula

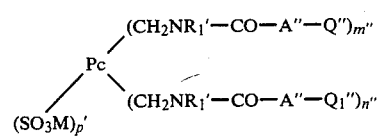

in which
Pc is a metal-free or metalized phthalocyanine group;
A″ is —CH$_2$—, —CH$_2$CH$_2$— or

Q″ and Q$_1$″ are both —NR$_2$″R$_3$″;
M is a cation or hydrogen;
R$_1$′ is hydrogen or methyl;
R$_2$″ is hydrogen, methyl, ethyl, n-propyl, isopropyl or butyl;
R$_3$″, independently of R$_2$″, has a significance of R$_2$″ or R$_2$″ and R$_3$″ together with the N-atom to which they are attached form an unsubstituted morpholine, unsubstituted pyrrolidine, unsubstituted piperidine, unsubstituted piperazine or N-methyl piperazine;
p′ is an average number from 0 to 0.7, inclusive;
m″ is an average number from 0.3 to 2.5, inclusive;
and n″ is an average number from 0.3 to 2.5, inclusive;
with the provisos that
(i) m″+n″ is an average number from 2.1 to 3, inclusive, and
(ii) one of Q″ and Q$_1$″ is non-cyclic and the other is cyclic.

2. A compound or mixture of compounds according to claim 1 wherein M is M′ where M′ is hydrogen, lithium, sodium, potassium or ammonium.

3. A compound or mixture of compounds according to claim 2 wherein Pc is Pc′ where Pc′ is copper, cobalt, iron, zinc, aluminum or nickel phthalocyanine.

4. A compound or mixture of compounds according to claim 2, wherein, in any dialkylamino group as Q" or Q₁", R₂" and R₃" are the same.

5. A compound or mixture of compounds according to claim 3 wherein, in any dialkylamino group as Q" or Q₁", R₂" and R₃" are the same.

6. A mixture of compounds according to claim 5 of the formula

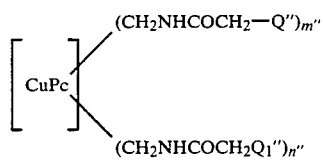

-continued

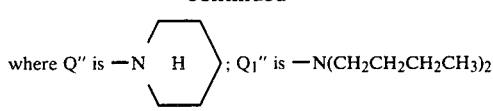

$m''$ is an average number 1 and $n''$ is an average number 0.3 to 2.5 or $n''$ is an average number 1 and $m''$ is an average number 0.3 to 2.5.

7. A mixture according to claim 6 wherein $m''$ is an average number 1 and $n''$ is an average number 0.3 to 2.5.

8. A mixture according to claim 7 wherein $n''$ is an average number 1.5.

9. A mixture according to claim 7 wherein $n''$ is an average number 1.3.

* * * * *